United States Patent [19]
Cole

[11] Patent Number: 4,735,280

[45] Date of Patent: Apr. 5, 1988

[54] SEISMIC SHEAR WAVE VIBRATOR WITH TELESCOPING BLADE

[75] Inventor: Jack H. Cole, Ponca City, Okla.

[73] Assignee: Conoco Inc., Ponca City, Okla.

[21] Appl. No.: 496

[22] Filed: Jan. 5, 1987

[51] Int. Cl.$^4$ .............................................. G01V 1/02
[52] U.S. Cl. .................................. 181/113; 181/114; 181/121; 367/75
[58] Field of Search ........................ 367/75, 189, 190; 181/108, 113, 114, 121, 400, 401

[56] References Cited

U.S. PATENT DOCUMENTS

| | | | |
|---|---|---|---|
| 4,135,598 | 1/1979 | Stafford | 181/114 |
| 4,334,592 | 6/1982 | Fair | 181/121 |
| 4,639,905 | 1/1987 | Goodloe | 367/75 |

Primary Examiner—Charles T. Jordan
Assistant Examiner—John W. Eldred

[57] ABSTRACT

This invention is an improved type of shear wave vibrator are carried by a support vehicle and utilizing telescoping tubes for energy engagement within an underlying earth medium. A shear wave vibrator so constructed is particularly desirable for use over marshy or soft surface earth areas. The device consists of a jack assembly supporting a shear wave vibrator relative to a suitable carrier vehicle in vibrationally isolated manner. The vibrator structure consists of a pair of parallel, elongatable telescoping blades for earth penetration and engagement with a passive reaction mass pivotally secured across the top portion of the telescoping blades and an active mass/vibrator system pivotally secured across the lower portion of the telescoping blades adjacent the earth surface.

11 Claims, 4 Drawing Sheets

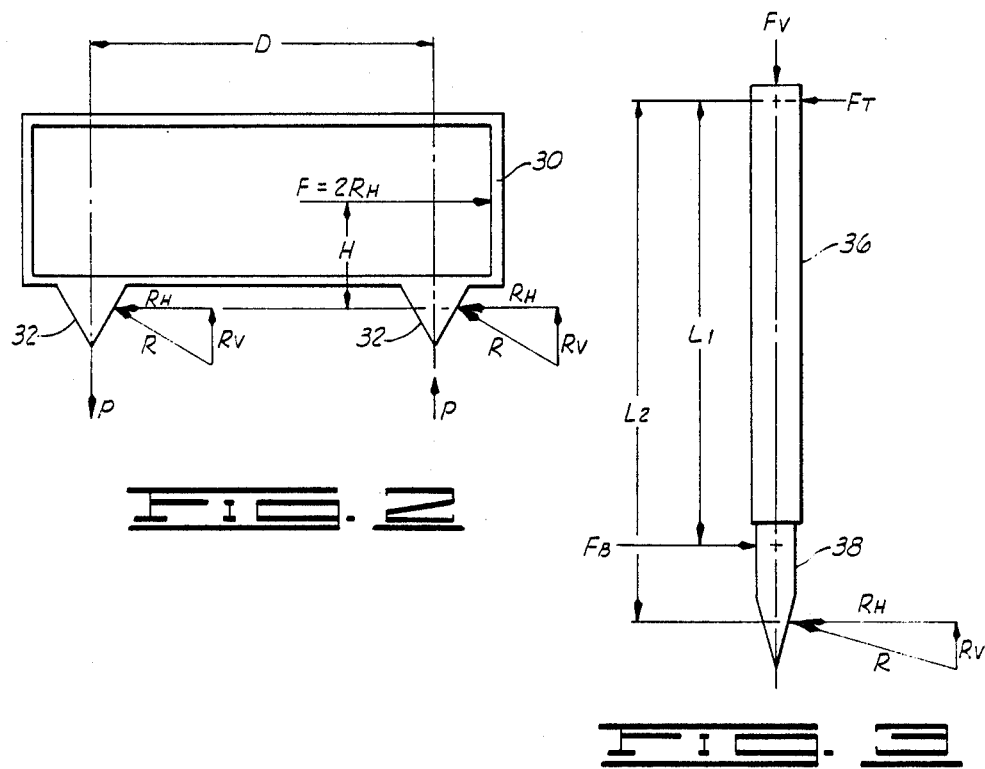
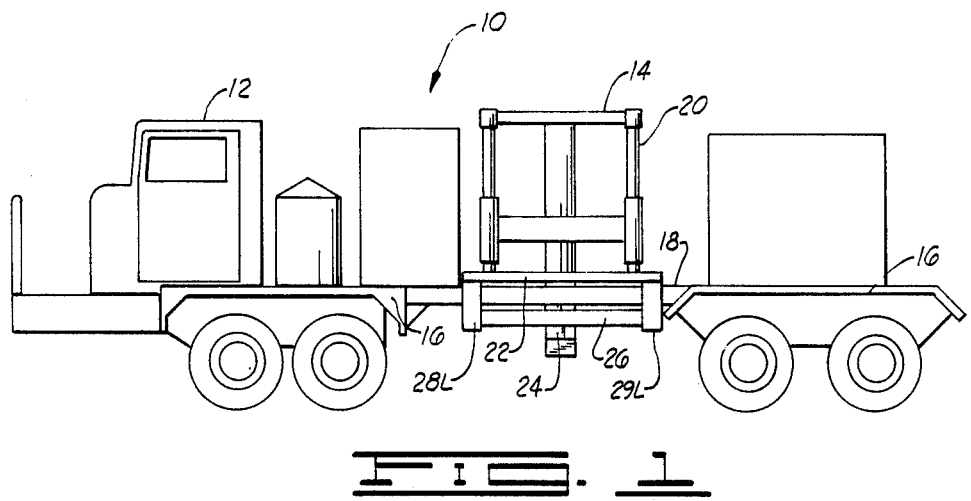

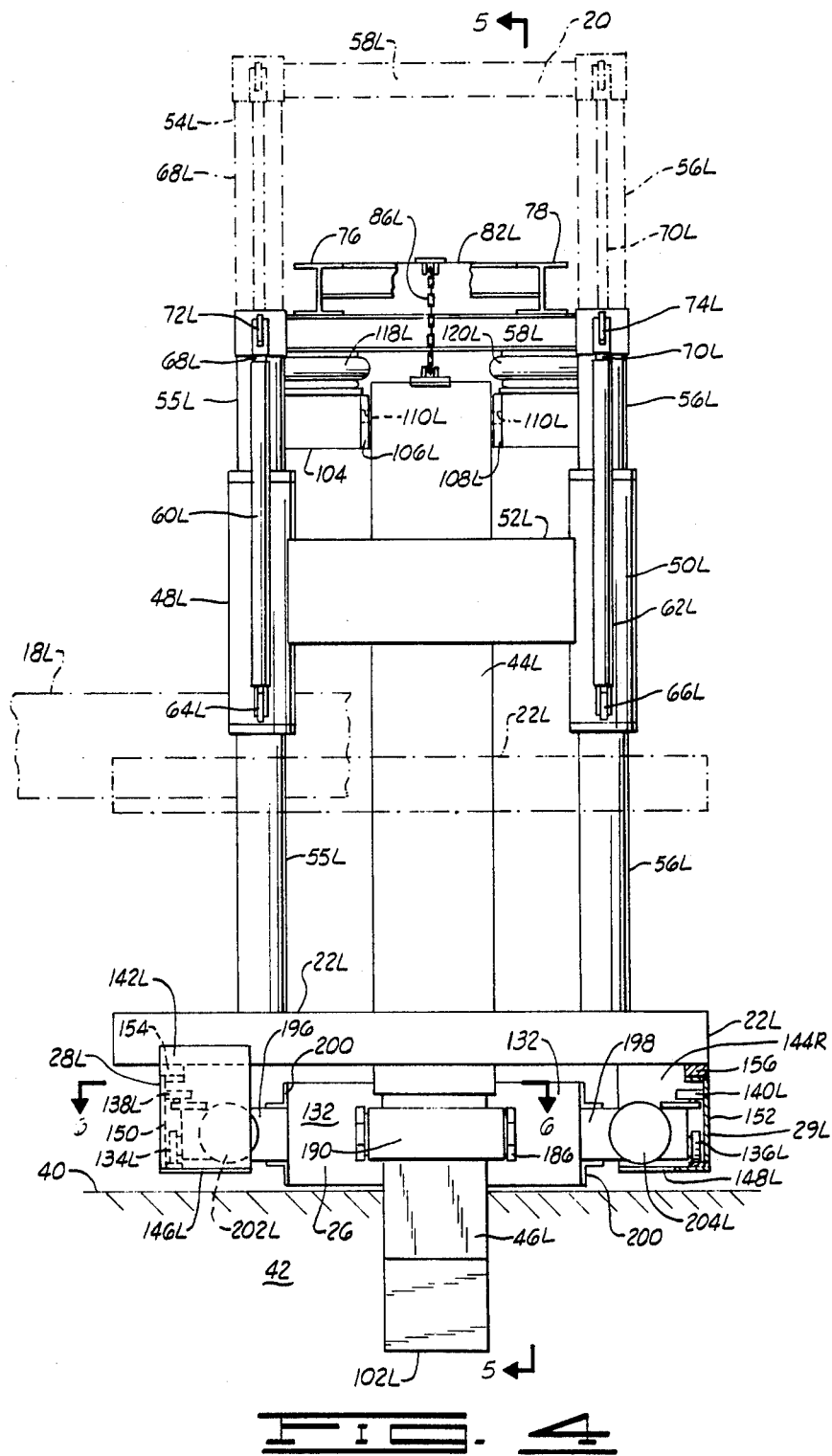

SEISMIC SHEAR WAVE VIBRATOR WITH TELESCOPING BLADE

BACKGROUND OF THE INVENTION

1. Field of the Invention

The invention relates generally to seismic shear wave vibrators and, more particularly, but not by way of limitation, it relates to improvements in vibrator and transport structure that enables more efficient shear wave energy coupling into an earth medium, particularly a soft earth medium such as might be encountered in marshy areas or water bottoms.

2. Description of the Prior Art

Applicant is aware of a number of different attempts to generate shear wave energy. Early structures attempted shear wave generation by simple impulsive striking of knife-edge structures in order to generate shear waves of requisite polarity. Polarity was selectively controlled simply by orientation of the knife-edge relative to the earth medium. Sometime later, as full value and benefit of shear wave usage became known, various attempts were made at generation of shear waves on both land and sea bottom by both vibratory and explosive or other implusive devices. In general, the prior vibratory devices were coupled through a flat, earth-engaging baseplate which may include various types of cleat or ridge coupling structure. Still other forms of source attempted energy engagement using a knife-edge type of device and this form of energy coupling was found to be particularly desirable in attempts to generate shear waves in watercovered areas.

SUMMARY OF THE INVENTION

The present invention relates to improved structure for generation of seismic shear waves, particularly for generation of shear waves over soft earth surface areas, marshy land and water-covered bottom medium. Thus, the present invention teaches a jack-support and shear wave vibrator system that is suitable for mounting on any of land vehicles, marsh buggies, marine vehicles and the like for control and actuation to generate seismic shear wave energy into soft earth medium. Elongatable jack structure is rigidly secured to the support vehicle to suspend in vibration isolation a pair of parallel disposed tubular blade structures that are insertable into earth engagement. A shear wave vibrator is disposed transversely between the blades and is operated in conventional manner by means of hydraulic and electronic control equipment, and blade engagement is assured by the jack structure as a selected portion of the total weight of the support vehicle is brought to bear on the engaging blades through vibration isolation structure.

Therefore, it is an object of the present invention to provide a shear wave vibrator that is capable of deeper soil penetration and is therefore more suitable for use on soft earth surfaces.

It is yet another object of the invention to provide a vehicle mounted shear wave vibrator that eliminates generation of double-frequency compression wave components.

It is still further an object of the invention to provide a shear wave vibrator of increased efficiency wherein less energy is required to drive lighter moving parts.

Finally, it is an object of the present invention to provide a retractably engaging shear wave vibrator that requires less hold-down force than comparable prior types that utilize energy-coupling baseplates and the like.

Other objects and advantages of the invention will be evident from the following detailed description when read in conjunction with the accompanying drawings which illustrate the invention.

BRIEF DESCRIPTION OF THE DRAWINGS

FIG. 1 is a view in side elevation of a typical vibrator support vehicle with center-mounted telescoping blade shear wave vibrator;

FIG. 2 is a diagram illustrating force distribution in a conventional type of shear wave vibrator;

FIG. 4 is a view in side elevation of the telescoping blade vibrator of the invention;

FIG. 6 is a partial section taken along lines 6—6 of FIG. 4.

DETAILED DESCRIPTION OF THE INVENTION

Figure 3:
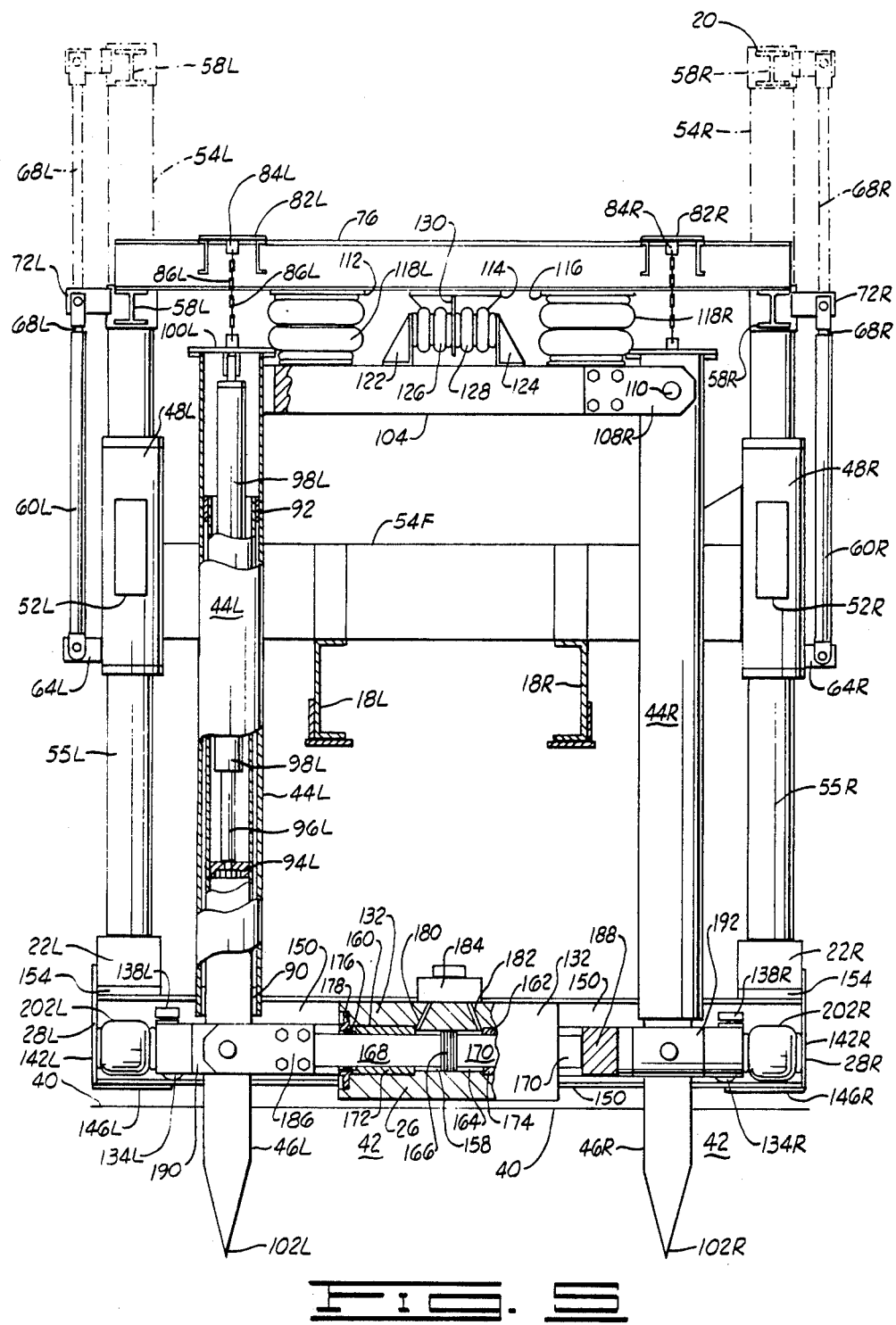
FIG. 3 is a diagram indicating force distribution in a telescoping blade vibrator, the subject of the invention.

Referring to FIG. 1, there is illustrated a vibrator vehicle 10 consisting of a carrier vehicle 12 and a center-mounted telescoping blade shear wave vibrator 14. The vehicle 12 is a type of utility vehicle manufactured by Crane Carrier Corp. for specific use in combination with seismic vibrators. In the past, such vehicles have been used to carry various types of vibrators in center-mount such as compressional wave, shear wave, high frequency and other specialized vibrator types. The vehicle 12 is a complete source machine in that it provides all requisite hydraulics and electrical equipment in association with vibrator 14 on the main frame 16.

On the center mounting truck frame 18, the vibrator 14 includes a hydraulic jack assembly 20 cooperating with vibrator foot structure 22 in control of the earth-engaging telescoping blade 24. The actual vibrator reaction mass in this design is the reaction mass 26 as secured to oppositely-disposed guide housing 28 L (left) and 28 R (right), and 29 L and R, as will be further described below.

The essence of the present invention is the telescoping blade approach to coupling of energy into the earth medium, this being particularly effective on soft earth surfaces. Also, by employ of this form of coupling, there is complete elimination of doublefrequency compression waves within the generated seismic energy. This is achieved by elimination of couple as between earth-engaging points of the energycoupling structure. FIG. 2 is a generalized diagram of a conventional form of baseplate 30 as it is placed in engagement with the earth medium utilizing a plurality of foot or cleat structures 32. Forces associated with the vibrator action of a conventional shear wave vibrator acting through baseplate 30 are illustrated by the vector diagrams. Inertia forces are not shown because they are not important to this particular description.

Considering FIG. 2, as the actuator inside the associated reaction mass exerts a horizontal force F to the baseplate 30, the cleats 32 feel reaction forces R. R may be separated into horizontal component $R_H$ and a vertical component $R_V$. The summation of the horizontal forces shows that $F=2R_H$, and the vertical components $R_V$ are simply reacted by the hold-down forces (not shown) acting upon the system.

These equal and opposite horizontal forces F and $2R_H$ produce a couple of magnitude F.H and this magnitude can only be reacted by an equal and opposite couple. Such opposite couple is produced by the vertical forces P acting through the distance D; however, P is equal to F.H/D and reverses direction each time force F reverses direction, which occurs twice per cycle. Thus, each cleat 32 produces a separate vertical pounding action on the earth during one cycle of shear action vibration, and this vertical pounding produces an undesirable compression wave at twice the vibrator driving frequency.

Alternatively, the force diagram for the telescoping blade vibrator concept is illustrated in Fig. 3. In this case, hold-down force is applied to a pivot arm 36 and telescoping blade 38 as it is firmly engaged in the earth medium. Inertia force components are not shown. $F_B$ is the horizontal force applied to the actuator in the vibrator reaction mass to the telescoping blade. The earth reacts on the blade 38 with a force R which may be resolved into a vertical component $R_V$ and a horizontal component $R_H$. $R_V$ is reacted by the hold-down force $F_V$ bearing on pivot arm 36. Summing moments about the pivot point shows that $R_H = F_B \times L_1/L_2$, and summing forces in the horizontal direction yields $F_T = F_B - R_H$; or, substituting, $$F_T = F_B X [1 - (L_1/L_2)] \qquad (1).$$

$F_T$ is produced by the pivot arm 36 acting against the top, passive reaction mass and is equal to this mass multiplied by the horizontal acceleration of the pivot point. Vibratory motion of the top reaction mass is isolated from the top support structure by the air mount isolators such that the horizontal isolators tend to keep the mass centered. No couple is produced and the vertical double-frequency pounding action has been eliminated.

It should be practical to make the total blade/pivot arm mass, being accelerated by the actuator in the bottom reaction mass, substantially less than the total mass of a conventional shear wave vibrator baseplate. Then, for an equal size actuator, a greater amount of force should be available for application against the ground. Hence, the telescoping blade shear wave vibrator should be more efficient than a conventional shear wave vibrator.

Figure 5:
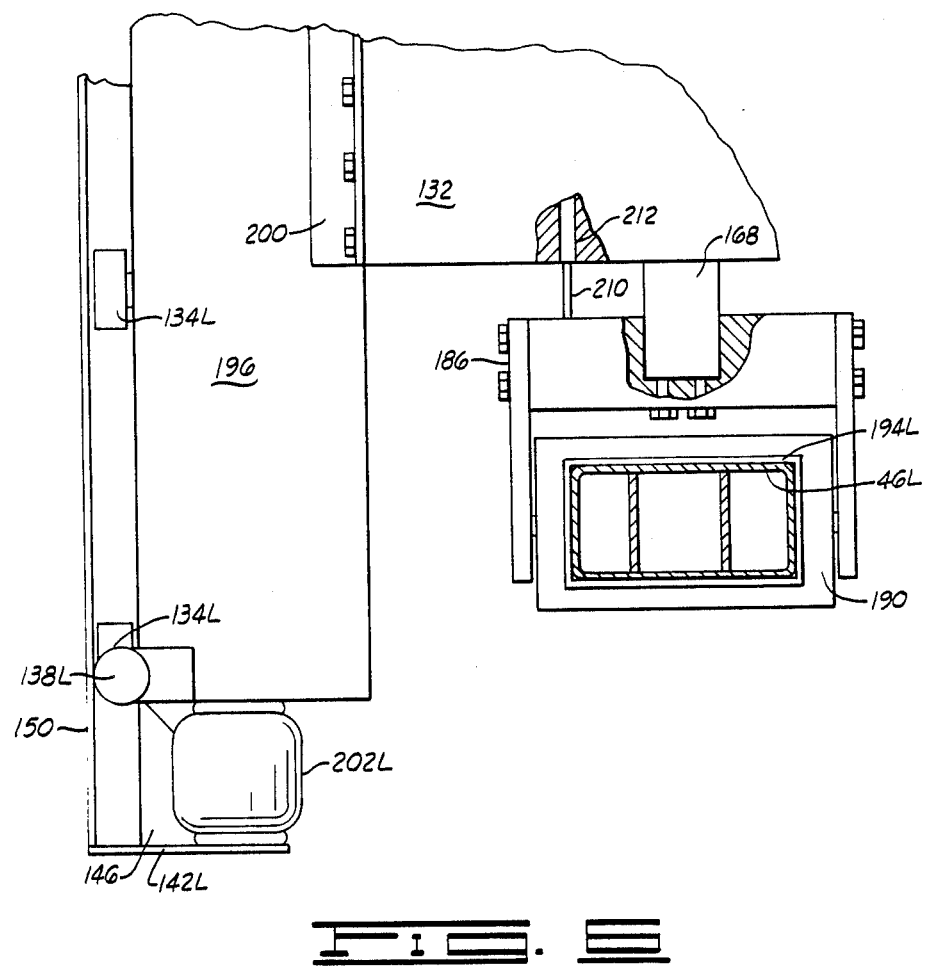
FIG. 5 is a section taken along lines 5—5 of FIG. 4 with parts shown in cutaway.

FIGS. 4, 5 and 6 all relate to the vibrator, telescoping tube coupling member, and the jack assembly for carriage of the structure on the carrier vehicle. The vibrator and jack structure is essentially duplicated on opposite sides and many such similar components will be designated with like numerals and left and right designations. Thus, referring primarily to FIG. 4 and other figures where noted, the jack assembly 20 is supported on truck center frame 18 to suspend foot structure 22. The vibrator reaction mass 26 is lowered by means of jack assembly 20 adjacent surface 40 of earth medium 42 as pivot arm 44 L directs telescoping blade 46 L into earth medium 42. The opposite side foot member 22 R provides similar support for the opposite side of reaction mass 26 and pivot arm 44 R and telescoping blade 46 R in earth engagement.

The jack assembly 20 consists of forward guide cylinder 48 L and rear guide cylinder 50 L as interconnected by a horizontal bar 52 L. A pair of transverse channels 54 forward and rearward connect between respective left and right guide cylinders 48 and 50, and channel members 54 are secured as by welding on top of truck frame 18. Each of guide cylinders 48 and 50 then movably receives a respective guide rod 55 and 56 L vertically therethrough. The guide rods 55 and 56 are connected together longitudinally by a channel member 58 L at the top, and the bottom ends are rigidly secured to foot structure 22 L. Foot structure 22 is a suitable channel member or the like that is suitably connected as by welding to structure movably supporting the vibrator reaction mass, as will be further described.

Each of the guide rods 55 L and 56 L are movable relative to the respective guide cylinders 48 L and 50 L by means of hydraulic actuators 60 L and 62 L. Thus, each of actuators 60 and 62 is connected at a respective pivot post 64 L and 66 L with actuator arms 68 L and 70 L connected to pivot posts 72 L and 74 L on the respective top caps of guide rods 55 L and 56 L. The phantom showing illustrates the oxtension of actuator arms 68 L and 70 L and the consequent raising of guide rods 55 L and 56 L relative to their respective guide rod cylinders 48 L and 50 L. Accordingly, the raised position of foot structure 22 L is also shown in phantom outline. The identical structure will be seen in mirror reversal on the right side as is further indicated from FIG. 5.

Transverse support between upper longitudinal channels 58 L and 58 R is provided by channel members 76 and 78. Longitudinal channels 82 L and 82 R are provided to position respective chain brackets 84 L and 84 R for support of extension chains 86 L and 86 R. Chains 86 L and 86 R support opposite sides of the telescope structure to provide a limited downward traverse when in the inoperative or transit mode.

Referring primarily to FIG. 5, the left and right telescoping tubes consist of rectangular tubes forming pivot arms 44 L and 44 R and the concentrically reciprocating telescoping blade 46 L and 46 R. A bearing such as a bronze metal bearing 90 is secured about the inner end of each pivot arm 44 L and 44 R in sliding contact with the outer surface of telescoping blade 46 L and 46 R. The upper end of blade 46 L and 46 R then includes a similar bronze bearing 92 L and 92 R secured therearound in sliding contact with the interior surface of pivot arm 44 L and 44 R. A respective retainer plate 94 L and 94 R is suitably secured across blade 46 L at a selected position therealong to provide connection for an actuator arm 96 L of a hydraulic actuator 98 L having its base pivotally connected to a top plate 100 L suitably secured over the upper extremity of pivot arm 44 L.

Thus, operation of hydraulic actuators 98 L and 98 R in concert will effect extension or retraction of telescoping blade 46 L and 46 R relative to the respective pivot arm 44 L and 44 R thereby to position the telescoping blade relative to the support apparatus. The lower portion of respective telescoping blades 46 L and 46 R are preferably reinforced with solid metal structure, e.g., a knife-edge point 102 L and 102 R with edge aligned longitudinally.

The upper ends of pivot arms 44 L and 44 R are connected by a transversely arrayed top reaction mass or what may be termed a passive reaction mass 104 which is secured by pivot plates 106 L and 106 R and 108 L and 108 R in rotatable connection to pivot pins 110 L and 110 R as secured on respective pivot arms 44 L and 44 R. The pivot plates 106, 108 are suitably secured as by heavy bolts in guadrature array to support the top reaction mass 104 pivotally as between the upper ends of pivot arms 44 L and 44 R. The top reaction mass 104 is comprised of a heavy block of metal and may weigh up to several thousand pounds.

The top reaction mass 104 is attached to the transverse channels 76, 78 by a plurality of air mounts. Thus, transversely distributed longitudinal connector plates 112, 114 and 116 are welded longitudinally between the undersides of transverse channels 76 and 78 to provide connection of a quadrature array of air mounts 118 L and 118 R and 120 L and 120 R as the respective air mounts are suitably connected to the top surface of reaction mass 104. Centrally to the vertical isolation air mounts, on both the front and rear edges of reaction mass 104, is a transverse air mount isolating horizontal movement of the reaction mass. Spaced brackets 122 and 124 secured as by welding on top of reaction mass 104 are then connected through suitable air mounts 126, 128 to a central bracket plate 130 that is secured perpendicularly to the underside of longitudinal plate 114. The similar horizontal vibration isolation is supplied equally fore and aft relative to top reaction mass 104.

The bottom or active reaction mass 132 is supported within a guide housing 28, 29 that is secured to the bottom side of foot structures 22 L and 22 R in slidable relationship to the telescoping blades 46 L and 46 R, as will be further described. The reaction mass 132 is supported in horizontally movable manner as it is supported by transverse rollers 134 and 136 (L and R) and horizontally disposed transverse rollers 138 and 140 (L and R).

The guide housing 28 L and R are formed by oppositely disposed thrust plates 142 (L and R), and brace plates 146 and 148 (L and R). Respective forward and rear transverse cross channels 150 and 152 are then secured transversely of the cradle or guide housing structure. The upper channel edge of cross channels 150 and 152 are then suitably secured as by welding or fasteners through spacers 154, 156 (L and R) to opposite foot structures 22 L and 22 R. The rear guide housings 29 L and R are similarly formed.

The primary reaction mass 132 is a conventional type of laterally oscillating mass structure of generally rectangular steel formation and defining a central bore 158 therethrough. Bore 158 includes equal counterbores 160 and 162 which define a cylinder chamber 164. A piston 166 having rod ends 168 and 170 is disposed within chamber 164 as rod ends 168 and 170 extend axially through bearing sleeves 172 and 174. A similar configuration of packing 176 and retainer plate 178 is secured at each end of the bore 158 to sealably retain the double end piston 166 in reciprocably operable position. Ports 180 and 182 are formed to communicate between the opposite sides of piston 166 in chamber 164 and an electro-hydraulic servo valve 184 in order to provide control of hydraulic fluid pressure to the opposite sides of chamber 164 thereby to drive the vibrator reciprocably in well-known manner.

As shown also in FIG. 6, each rod end 168 and 170 extends outside of the confines of mass 132 into connection with the respective pivot yoke 186 and 188. The bifurcated pivot yokes 186 and 188 are rigidly secured to the ends of rod ends 168 and 170 as each pivotally contains a respective rectangular guide frame 190 and 192 in sliding surround of respective telescoping blades 46 L and 46 R. As shown in FIG. 6, a suitable bronze bearing line 194 L and 194 R is secured to line the inner surface of pivoting guide frames 190, 192 in sliding association with the respective telescoping blades.

Each of the forward and rearward edges of the primary reaction mass 132 includes a respective secondary mass 196 and 198 rigidly secured thereon by bracket/blot arrangements 200. The secondary masses 196, 198 are also selected to be of heavy metal formation additive to the overall reaction mass 26. The forward and rearward transverse rollers 134 L and 136 L are rotatably secured to the lower outside portion of respective secondary mass 196 and 198, and rollers 134, 136 ride on the lower channel of forward cross channel 150 and rearward cross channel 152. The horizontal rollers 138 L and 138 R and 140 L and 140 R are supported from the forward and rearward edges of secondary mass 196 and 198 to roll against the vertical interface of respective cross channels 150 and 152. The opposite sides of the secondary masses 196 and 198 are further supported to maintain central disposition by forward and rearward air mounts 202 L and 202 R and 204 L and 204 R as secured between the respective side surfaces of secondary masses 196 and 198 and the adjacent thrust plate 142 L and 142 R.

Thus, transverse reciprocation of reaction mass 132 takes place between air mounts 202 and 204 (L and R), while being supported by rollers 134, 136 (L and R), and transverse alignment rollers 138, 140 (L and R). The transverse vibratory motion from reaction mass 132 is also transmitted through respective guide frames 190, 192 to the telescoping blades 46 L and 46 R as disposed in energy-coupling relationship within earth medium 42.

Vibratory drive of reaction mass 132 is supplied in conventional manner in accordance with prior developed VIBROSEIS ® type electronic control systems. Thus, electro-hydraulic servo valve 184 is connected to supply alternating fluid pressure via ports 180 and 182 (FIG. 5) to the cylinder chamber 164 thereby to reciprocally actuate piston 166 relative to reaction mass 132 and impart lateral vibration through the telescoping blades 46 L and 46 R into the earth medium 42. The associated electronic control system may be operated in known manner to control the requisite frequency, duration and sweep content of the vibratory sequences. Position sensing of active reaction mass 132 may be sensed utilizing a conventional LVDT differential transformer (FIG. 6) wherein a stem 210 is secured to pivot yoke 186 to extend for reciprocation within the LVDT coil 212 as disposed within the side of primary reaction mass 132. The sensed position signal from coil 212 is then fed back to the electronic control circuitry for interactive use in developing the control signal for servo valve 184.

In operation, the tubular vibrator support vehicle is positioned over the source point on earth surface 40 whereon the linear actuator cylinders 60 and 62 (L and R), are energized to retract respective actuator arms 68, 70 (L and R), thereby to lower the foot structure 22 L and 22 R earthward to place the transverse vibrator reaction mass 132 adjacent surface 40 of the earth medium 42. Thereafter, the telescoping blade hydraulic actuators 98 L and 98 R are actuated to extend their respective actuator arms 96 L and 96 R thereby to drive the telescoping blades 46 L and 46 R downward through surface 40 into secure engagement within earth medium 42. Such secure engagement is maintained throughout vibratory operation by applying a constant downward actuation pressure to the telescoping blade actuator 98 L and 98 R. The amount of penetration will depend upon the softness and texture of the earth medium 42. A sufficient amount of the total truck weight is brought to bear downward on the points of telescoping blades 46 L and 46 R as such weight is imposed through transverse channels 76 and 78 and the quadrature arrayed air mounts 118 and 120 (L and R), bearing upon the top or passive reaction mass 104.

Thus, pivot arms 44 L and 44 R and telescoping blades 46 L and 46 R are forced down into the earth medium 42 and vibrationally isolated from the holddown weight thereabove bearing on passive reaction mass 104. The transverse vibrator may be maintained just above the earth surface 40 in non-interfering position by means of the elevating cylinders 60, 62 (L and R), in control of positioning of guide rods 54, 56 (L and R). The transverse vibrator is then operated at the selected frequency, and duration under the control of the associated electronics and hydraulic equipment functioning through servo valve 184. The transverse reciprocal movement is then transmitted through the opposite side guide frames 190 and 192 to the respective left and right telescoping blades 46 where the vibration is imparted into the earth medium 42 as shear wave energy.

The foregoing discloses a novel form of seismic energy vibrator which provides energy coupling through the use of telescoping blades. The present type of shear wave generation and coupling apparatus offers a number of distinct advantages over the prior art types that utilize various forms of baseplate and cleat structure for accomplishing energy penetration. The present invention provides optimum energy coupling in softer forms of earth surface while also eliminating interfering double-frequency compression waves from the energy content. Also, the present invention requires less holddown force and energy expenditure while developing proportionately greater content of shear wave energy.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are as follows:

1. Apparatus for generating and coupling shear waves into an earth medium, comprising:
   first and second elongated tubes rigidly extending respective first and second blade tips for insertion in an earth medium;
   means for maintaining said tubes parallel;
   piston means having first and second rod ends rigidly junctured against respective first and second blade tips;
   a reaction mass having a cylinder and being slidably disposed on said piston means and first and second rod ends; and
   means for reciprocating said reaction mass relative to said blade tips to impart seismic waves into said earth medium.

2. Apparatus as set forth in claim 1 which is further characterized to include:
   a hold down weight means secured to bear upon said first and second elongated tubes.

3. Apparatus as set forth in claim 1 wherein said means for maintaining comprises:
   mass means pivotally connected between said first and second elongated tubes and disposed parallel to said piston means.

4. Apparatus as set forth in claim 3 which is further characterized to include:
   a hold down weight means; and
   vibration isolation means secured to support said hold down weight means over said mass means.

5. Apparatus as set forth in claim 1 wherein each of said first and second elongated tubes comprises:
   a tubular pivot arm having first and second ends with the first end pivotally secured to said means for maintaining;
   a blade having a first end and a narrowed tip end with the first end being slidingly received within the pivot arm second end; and
   means for telescopically adjusting the pivot arm relative to the blade.

6. Apparatus as set forth in claim 5 wherein said means for maintaining comprises:
   mass means pivotally connected between said first and second elongated tubes and disposed parallel to said piston means.

7. Apparatus as set forth in claim 6 which is further characterized to include:
   a hold down weight means; and
   vibration isolation means secured to support said hold down weight means over said mass means.

8. Apparatus as set forth in claim 7 wherein said hold down weight means comprises:
   a land vehicle.

9. Apparatus as set forth in claim 1 which is further characterized to include:
   hold down weight means;
   first and second jack means secured to said hold down weight means and disposed to extend parallel to said respective elongated tubes;
   first and second foot structures secured to respective first and second jack means for uni-planar support of opposite ends of said piston means and reaction mass;
   and vibration isolation means connected between said hold down weight means and said means for maintaining said tubes parallel.

10. Apparatus as set forth in claim 9 wherein said means for maintaining comprises:
    a heavy body of preselected weight forming a passive reaction mass.

11. Apparatus as set forth in claim 10 wherein:
    said hold down weight means is a land vehicle.

* * * * *